Dec. 16, 1930.  A. E. CHRISTENSEN  1,785,296
LINE LEVEL
Filed July 21, 1927
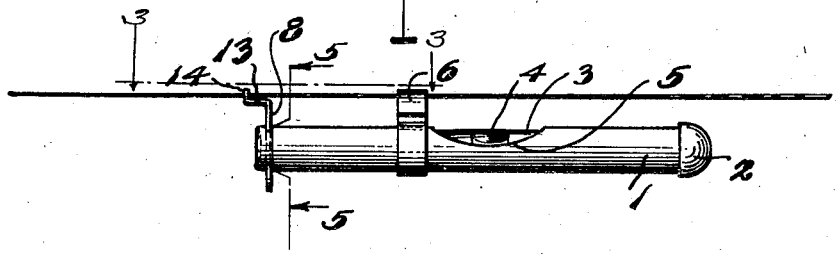
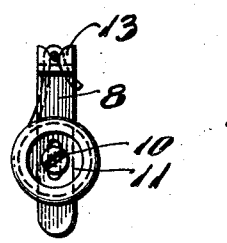
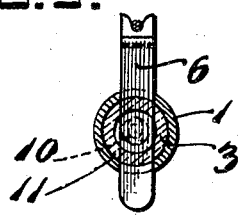
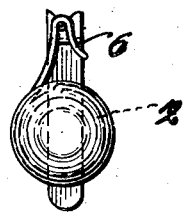
Inventor
Anders E. Christensen
By Robb & Robb
Attorneys Patented Dec. 16, 1930

1,785,296

UNITED STATES PATENT OFFICE

ANDERS E. CHRISTENSEN, OF MAYFIELD HEIGHTS, OHIO

LINE LEVEL

Application filed July 21, 1927. Serial No. 207,460.

Line levels are commonly employed in construction work to determine whether or not a line is in the required horizontal position. These levels are usually attached to the line by two hooks by which it is sustained. Obviously such an arrangement would accurately determine the level of the line only when it is placed in the middle thereof. If it were placed anywhere else along the line the sag would have a tendency to make the level slip along the line and a true level coud not be indicated thereby.

The object of the present invention is to provide a line level of novel construction which may be applied at any place along the line to indicate whether or not the desired level has been obtained In carrying out the invention a level is provided that will not slip along the line in any way, but will remain at the place where it is applied. It is to be noted that a level may be much more readily attached to a line used in the constructon of buildings, etc., adjacent the end thereof than in the middle, it being much more convenient to apply it in such a place. In attaining this end a level is provided with a hook which is offset from the center of gravity of the level and a notched member is provided at the end of the tube carrying the hook member. This notched member will exert an upward pressure on the line which is caused by the weight of the level suspended by the hook. It will be noted that this arrangement maintains the level in the desired position regardless of the sag in the line. The line between the hook and the notched member assuming an angle with respect to the remainder of the line prevents any slipping of the level therealong.

A more particular object of this invention is to provide a novel means for adjustably securing the notched member to the level, whereby adjustability in its position may be obtained.

With these and further objects in view, as will in part become apparent and in part be hereinafter stated, this invention comprises certain novel constructions, combinations and arrangements of parts as will subsequently be specified and claimed.

For a complete understanding of the invention reference may be had to the following description and accompanying drawings, in which Figure 1 is a side elevation showing the level made in accordance with the invention.

Figure 2 is an end elevation.

Figure 3 is an enlarged, cross sectional view taken on the line 3—3 of Figure 1, showing in detail the construction of one end of the tube.

Figure 4 is an end elevation taken from the end opposite that shown in Figure 2.

Figure 5 is a detailed cross-section taken on the line 5—5 of Fig. 1, showing the mounting of the notched member.

While the preferred form of the invention is herein set forth, it is to be understood that it is not to be limited to the exact construction shown, as various modifications of these details may be provided in putting the invention into practice within the purview of the appended claims.

A level made in accordance with this invention comprises a casing 1, which may be of any suitable material. Aluminum is a metal that has been found suitable for all general purposes. This casing has the cap 2 on one end thereof, which is rounded, as shown in Figure 1, and at the other end certain closure structure is employed, which will hereinafter be described. This casing 1 houses the tube 3, which contains the fluid or spirits, and bubble 4. This tube and the spirits constitute the spirit level. Intermediate its ends the casing is cut away, as shown at 5, so that the position of the bubble 4 in the tube may be seen.

Offset a very slight distance from the center of gravity of the level is the hook 6, and in the present form of the invention this hook is shown as a band, although any desired construction of this hook may be readily employed. It is noted that one end of the hook passes completely around the casing and is embedded therein, as shown at 7. This prevents any movement of the hook along the casing. This hook is adapted to suspend the level on a line when used in conjunction with a notched member 8 on the end of the casing.

The top and bottom of the casing are slotted, as shown at 9, to accommodate the notched member 8 which passes through these slots. The member 8 is maintained in the desired position by a screw 10, which is mounted in the notched member and has threaded engagement with the member 8. A washer 11, having a slot 11', is provided in the end of the casing, said washer 11 being held in position by the bent over edges 12 of the casing 1. It will be readily seen that after the screw 10 has been loosened that the member 8 may be placed in any desired position, as the screw 10 will move in the slot 11' where it will be held by the tightening of the screw.

One end of the member 8 is bent over, as shown at 13, said bent over portion in turn being bent up to provide a notched lug 14. The notch in this lug receives the line when the level is applied thereto and prevents any sidewise motion of the line with respect to the member 8.

When the level is to be used at some desired place, as adjacent one end of the line, the hook 6 is put over the line and the notched member 8 placed in engagement therewith. Obviously the hook exerts a downward pressure, while the member 8, due to the offset relation of the hook, exerts an upward pressure against the line, whereby the level is maintained in the desired position. As the line between the hook and notch member 8 will be at an angle with respect to the remainder of the line any sliding of the level is effectively prevented. The level may be adjusted to accommodate lines of different lengths, and having different sagging properties by adjusting the position of the member 8, as previously set forth.

Having thus described my invention what I claim as new, and desire to secure by Letters Patent of the United States, is:

1. A line level of the class described, comprising, in combination, an elongated casing having slots near one end thereof, said end being crimped, a suspension member secured to the casing, a member slidable in said slots and having a screw threaded aperture therein, a washer within said casing and interposed between the last named member and the crimped end of the casing, said washer having a slot therein, and a screw passing through the slot in the washer and engaging the screw threaded aperture in said member, whereby the member may be adjusted in respect to the casing.

2. A line level of the class described, comprising, a level, a suspension means affixed thereto at one side of the center of gravity thereof for suspending the level from a line, and an upwardly extending member secured to the level at the same side of the center of gravity of the level as the suspension means but at a greater distance therefrom, whereby the weight of the level acting at the center of gravity of the same presses said member against the line when the level is suspended by the suspension means, the member having a V-shaped notch therein for receiving the line.

3. A line level of the class described, comprising, in combination, a level, and means for securing the level to a line, said means comprising a hook member affixed to the level at one side of the center of gravity of said level, whereby one part of the level will tend to move upwardly when said level is suspended from a line by said hook member, and means fastened to that part of the level which tends to move upwardly, for pressing against the line, thereby preventing such upward movement of the level and securing the same to the line so as to obviate any longitudinal movement of the level along the line.

In testimony whereof I affix my signature.

ANDERS E. CHRISTENSEN.